US008295390B2

(12) United States Patent
Koga et al.

(10) Patent No.: US 8,295,390 B2
(45) Date of Patent: *Oct. 23, 2012

(54) COMMUNICATIONS DEVICE AND COMMUNICATIONS METHOD

(75) Inventors: Hisao Koga, Fukuoka (JP); Yuji Igata, Fukuoka (JP); Go Kuroda, Osaka (JP); Koji Ikeda, Fukuoka (JP); Akio Kurobe, Osaka (JP); Hirotoshi Yamada, Tokyo (JP); Hiromu Okamoto, Tokyo (JP); Yoshinori Mizugai, Tokyo (JP); Takehiro Sugita, Tokyo (JP); Junichi Ohshima, Tokyo (JP); Shigeru Takasu, Tokyo (JP)

(73) Assignees: Panasonic Corporation, Osaka (JP); Mitsubishi Electric Corporation, Tokyo (JP); Sony Corporation, Tokyo (JP)

( * ) Notice: Subject to any disclaimer, the term of this patent is extended or adjusted under 35 U.S.C. 154(b) by 231 days.

This patent is subject to a terminal disclaimer.

(21) Appl. No.: 12/650,256

(22) Filed: Dec. 30, 2009

(65) Prior Publication Data

US 2010/0104030 A1 Apr. 29, 2010

Related U.S. Application Data

(63) Continuation of application No. 11/478,445, filed on Jun. 30, 2006, now Pat. No. 7,660,365.

(30) Foreign Application Priority Data

Jul. 5, 2005 (JP) .................................. 2005-196598

(51) Int. Cl.
*H04L 27/00* (2006.01)

(52) U.S. Cl. ........................................................ 375/295

(58) Field of Classification Search .................. 375/295, 375/257, 259, 296, 316, 222; 340/310, 538
See application file for complete search history.

(56) References Cited

U.S. PATENT DOCUMENTS

| 4,377,804 | A | 3/1983 | Suzuki |
| 4,988,972 | A | 1/1991 | Takagi |
| 5,828,293 | A | 10/1998 | Rickard |
| 6,101,214 | A | 8/2000 | Hershey |
| 7,218,679 | B2 | 5/2007 | Kodama |

FOREIGN PATENT DOCUMENTS

JP 2000 165304 6/2000

OTHER PUBLICATIONS

International Search Report dated Oct. 17, 2006.
"Powerline Telecommunications (PLT); Coexistence of Access and In-House Powerline Systems; ETSI TS 101 867", ETSI Standards, European Telecommunications Standards Institute, Sophia-Antipo, France, vol. PLT, No. V111, Nov. 2000, XP014006769, pp. 1-11.

*Primary Examiner* — Khai Tran
(74) *Attorney, Agent, or Firm* — Dickinson Wright PLLC

(57) ABSTRACT

A communications device 100, which performs data communication, includes an AC cycle sensor 30 which is connected to a power line 106 supplied with an a.c. voltage and generates a synchronous signal SS at timing of an a.c. voltage waveform AC of the power line 106; a data communicator 10 for performing data communication; and a communications controller 20 which performs communication of a control signal including information showing at least one of a communications device and a communications standard and controls the data communicator 101. When the a.c. voltage supplied to the power line 106 is an N-phase and when the cycle of the a.c. voltage waveform is T, data communication to be performed in a communication period subsequent to the period is controlled on the basis of the control signal included in the period of T/2M on condition that M is a natural multiple of N.

19 Claims, 7 Drawing Sheets

COMMUNICATIONS DEVICE AND COMMUNICATIONS METHOD

This is a continuation of application Ser. No. 11/478,445 filed Jun. 30, 2006, which is based on Japanese Application No. 2005-196598 filed Jul. 5, 2005, the entire contents of each of which are incorporated by reference herein.

BACKGROUND

The present invention relates to a communications device which is connected to a power line supplied with a predetermined a.c. voltage and performs data communication over the power line, as well as to a communications method.

When wired data communication is performed in home, in office, in a factory, or the like, by use of a terminal, such as a computer, wires to be used as transmission lines, such as cables and connectors, usually must be laid at required locations. Hence, various tasks must be carried out before operation of communications facilities is commenced.

Incidentally, in most cases, commercial power; e.g., an a.c. voltage (for example, 120V-60 Hz in the United States, 100V-50/60 Hz in Japan) is used in the home, the office, a factory, or the like. Accordingly, a power line (a lighting circuit) used for supplying the power has already been laid at all locations in the house, the office, the factory, and the like. Consequently, so long as the power line can be utilized for data communication, a necessity for newly laying a special wire for communication purpose is obviated. Specifically, a communications channel can be ensured by means of inserting a communications device into the power outlet.

A technique described in, e.g., Patent Document 1, has been known as a technique for utilizing such a power line for communication. Under present circumstances, conditions for utilizing power line communication (e.g., a frequency band) are under consideration in various countries, including Japan.

[Patent Document 1] JP-A-2000-165304

As things stand, specifications have not yet been defined in connection with a technique for utilizing a power line for communication such as that mentioned previously. Specifications of a communications standard, such as a protocol, a modulation system, and a frequency band, which are used for actual communication, vary according to a manufacturer which develops the technique.

When consideration is given to the environment where such a communications technique is actually used, there is a high probability that a plurality of types of communications standards mixedly exist in the same location. For instance, on the assumption that users (users of communications devices) reside in multiple housing, such as an apartment house or a condominium, the users residing in the same collective housing do not always use communications devices (e.g., modems) of the same manufacturer. Accordingly, there may arise a case where a plurality of types of communications devices uniquely manufactured by a plurality of manufacturers are simultaneously connected to the common power line.

When a plurality of types of communications devices, which differ from each other in terms of communications standards, such as a protocol and a modulation system, are connected to the same power line as mentioned above, a communications device cannot demodulate signals transmitted from communications devices of different systems and recognizes the signals as mere noise. Consequently, despite the fact that the plurality of types of communications devices use the same frequency band, mere presence of the other communications devices cannot be ascertained. For this reason, signals transmitted by communications devices of a plurality of types collide against each other, thereby rendering communication impossible. Specifically, difficulty is countered in coexistence of different types of communications devices on the common power line.

SUMMARY

The following embodiments has been conceived under the circumstances and aims at providing a communications device and a communications method, which enable control of data communication for avoiding occurrence of collision between signals even when a plurality of types of communications devices, which differ from each other in terms of communications standards, are connected to a common transmission line.

First, a communications device that is connected to a power line transmitting a waveform having characteristics of N-phase and T-cycle and performs communication by way of the power line, the communications device includes a synchronous generator that generates a synchronous signal based on the waveform; and a controller that outputs a control signal to the power line during a period of T/2M based on the synchronous signal generated by the synchronous generator, the control signal including information for allowing a plurality of communications devices to co-exist on the power line, the M being the N multiplied by a natural number.

By means of this configuration, timing is controlled by use of a synchronous signal generated on the basis of timing of an a.c. waveform of the power line. Hence, even the communications devices of different types can match timing of signal transmission and that of monitoring. By means of setting the period as TIM, an a.c. voltage of N-phase is used. Among a plurality of communications devices whose phases change according to the orientation of a connection between a power plug and a receptacle, control of data communication for avoiding collision between signals can be performed.

Second, in the communications device, the M is three.

By means of this configuration, the communications device can cope with a single-phase a.c. voltage and a three-phase a.c. voltage which are adopted in many countries in the world.

Third, in the communications device, the control signal includes a request for starting communication or communication end information.

By means of this configuration, the communications control section can control data communication by means of solely commencement of communication and end of communication as communication timings of the control signal. Accordingly, processing load imposed on the control signal can be lessened.

Fourth, the communications device further includes: a data communications section that performs data communication by way of the power line, wherein the controller controls data communication performed by the data communications section in accordance with the control signal.

By means of this configuration, an a.c. voltage of N-phase is used, and among a plurality of communications devices whose phases vary according to the orientation of a connection between a power plug and a receptacle, control of data communication for avoiding collision between signals can be performed.

Fifth, in the communications device, the controller controls data communication during a communication period sequent to the period in accordance with the control signal.

By means of this configuration, data communication of the communications devices can be controlled in accordance with information about a coexistence standard included in the control signal.

Sixth, in the communications device, the controller controls data communication in a communication period subsequent to the period in accordance with the control signal received from the other communications device.

By means of this configuration, in accordance with a control signal output from another communications device, data communication of a communications device is controlled, thereby enabling data communication which avoids collision between signals.

Seventh, in the communications device, the communication period has a length of the period multiplied by an integer.

By means of this configuration, there is no necessity of changing the cycle of a period. So long as the communications segment is made longer, the processing burden imposed on the control signal can be lessened.

Eighth, in the communications device, the control signal further includes information showing a length of the communication period.

By means of this configuration, the period of the communications segment can be adaptively changed during communication, and flexible communication control can be performed.

Ninth, in the communications device, the data communications section performs data communication in each communication period.

By means of this configuration, data communication is performed in each communication period, so that communication can be performed by utilization of a desired data communication band. Thus, frequency efficiency can be enhanced.

Tenth, in the communications device, the control signal has a plurality of divided time segments, and specifics of control method are shown by a combination of signals of respective time segments.

By means of this configuration, for instance, the control signal is divided into K time segments. When binary information is shown in each time segment, the control signal can express specifics of control method of $2^K$ types.

Eleventh, in the communications device, the controller outputs a control signal including the same information in each of the plurality of periods which are adjacent to each other in terms of time.

By means of this configuration, reliability of coexistence processing of a control signal can be enhanced.

Twelfth, in the communications device, the controller outputs the control signal when the data communications section does not performs data communication.

By means of this configuration, the control signal and the data signal are not superimposed on each other in terms of time. Accordingly, leakage of a signal from one band to another band can be prevented, so that a drop in coverage can be prevented.

Thirteenth, a communications method for a communications device is connected to a power line transmitting a waveform having characteristics of N-phase and T-cycle and performs communication by way of the power line, the method includes: a step of generating a synchronous signal based on the wave form; and a step of outputting a control signal to the power line during a period of T/2M based on the synchronous signal generated by the synchronous generator, the control signal including information for allowing a plurality of communications devices to co-exist on the power line, the M being the N multiplied by a natural number.

By means of this method, timing is controlled by use of a synchronous signal generated on the basis of timing of an a.c. waveform of the power line. Hence, even the communications devices of different types can match timing of signal transmission and that of monitoring. By means of setting the period as TIM, an a.c. voltage of N-phase is used. There can be achieved synchronization among a plurality of communications devices whose phases vary according to the orientation of a connection between a power plug and a receptacle.

Accordingly, a communications device and a communications method can be provided, which enable control of data communication for avoiding occurrence of collision between signals even when a plurality of types of communications devices, which differ from each other in terms of communications standards, are connected to a common transmission line.

DETAILED DESCRIPTION OF THE PREFERRED EMBODIMENTS

Figure 1:
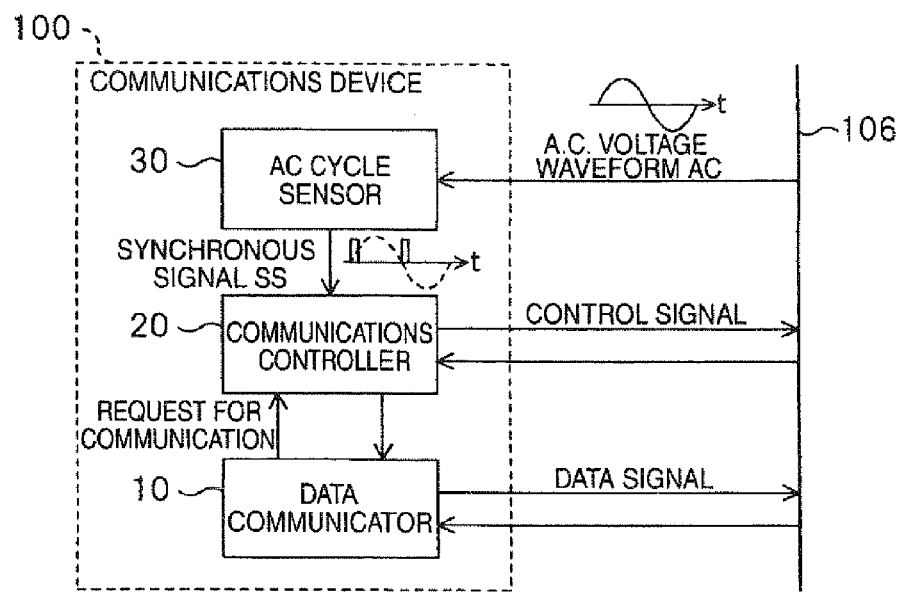
FIG. 1 is a functional block diagram showing an example general configuration of the communications device according to one embodiment.

An embodiment will be described hereinbelow by reference to FIGS. 1 through 11. First, there will be described a case where communications devices using a plurality of communications standards are connected to a common transmission line. FIG. 8 is a block diagram showing an example configuration of a system where a plurality of communications devices are connected to a common transmission line. In the embodiment shown in FIG. 8, a plurality of communications devices 100(A1), 100(A2), 100(B1), 100(B2), 100(C1), and 100(C2) are connected to a common transmission line 106. The communications devices 100(A1), 100(A2) perform communication according to a type-A communications standard; the communications devices 100(B1), 100(B2) perform communication in accordance with a type-B communications standard; and the communications devices 100(01), 100(C2) perform communication in accordance with a type-C communications standard. The "communications standard" signifies a protocol used for establishing communication between a transmitter and a receiver. For example, the protocol includes modulation-demodulation schemes such as an OFDM (Orthogonal Frequency Division Multiplexing) scheme and an SS (Spread Spectrum) scheme. Further, the communications standard is a concept encompassing specifications of a symbol rate and those of a frame format.

Therefore, the communications device 100(A1) and the communications device 100(A2) are of the same type; the communications device 100(B1) and the communications device 100(B2) are of the same type; and the communications device 100(C1) and the communications device 100(C2) are of the same type. However, the communications devices 100 (A1, A2), the communications devices 100(B1, B2), and the communications devices 100(C1, C2) are different from each other in terms of the type. In reality, a difference among the types signifies a difference in communications standards, such as a protocol, a data signal modulation system, a symbol rate of a data signal, and the like, which are employed in communication.

Power line communication is taken as an example where occurrence of such a situation is presumed. For instance, collective housing includes a plurality of independent households as users. However, the power line used as a transmission line is common, and power lines of the respective households are electrically connected together. In the meantime, the users of the respective households do not always use communications devices of the same manufacturers (i.e., the same communication standards), and hence there may be a case where the users of the respective households use the communications devices 100 which differ from each other in terms of type. In short, the communications devices 100 may differ from one manufacturer to another manufacturer in terms of the communications standard used for communication, such as a protocol, a data signal modulation system, a symbol rate of a data signal, and the like.

As mentioned above, when the plurality of communications devices 100 of different types are connected to the common transmission line 106, the respective communications devices 100 cannot demodulate signals transmitted by the communications devices 100 of different types, and hence cannot even detect presence of the other communications devices 100. Consequently, signals transmitted by the plurality of communications devices 100 of different types collide against each other on the transmission line 106. Since collision between signals disables communication, the plurality of communications devices 100 of different types cannot coexist on the transmission line 106, so long as special control is not carried out.

Accordingly, various types of coexistence standards are mentioned as an example where the plurality of communications devices 100 of different communications standards coexist in the same transmission line 106. Here, the term "coexistence standard" means a scheme for causing the plurality of communications devices 100 of different communications standards to coexist in the single transmission line 106 such that collision of signals is prevented; and signifies that data communication complying with different communications standards are separated from each other in terms of a frequency, time, a code, or a combination thereof, by use of a multidimensional connection system, such as frequency division, time division, code division, or the like.

In the case of frequency division, when the frequency band used for communication ranges from, e.g., 2 to 30 MHz, a communications standard A uses a frequency band from 15 to 30 MHz; and a communications standard B uses a frequency band from 2 to 15 MHz. As a result, the communications standard A and the communications standard B can be utilized in the common transmission line.

In the case of the coexistence standard of time division, the communications standard A and the communications standard B are switched at, e.g., predetermined time intervals, the communications standard A and the communications standard B can coexist on the common transmission line.

Here, so long as communication is performed by use of only a predetermined frequency band or a time domain according to a communications standard, collision of signals of different communications standards can be avoided. However, in consideration of communication efficiency, when communication is not performed with a plurality of communications standards, the communications standard by means of which communication is being performed preferably uses the entire band.

The embodiment describes a transmission device and a receiving device, which perform coexistence processing among communications devices of different communications standards by use of a control signal showing a communications device, a communications method, and the like, and which enable efficient communication without involvement of collision of signals even when communications devices of different communications standards are connected to a common transmission line such as a power line or the like. The term "control signal" is a signal including information about a coexistence standard for causing a plurality of communications devices of different communications standards to coexist in a power line: specifically, a signal showing control method specifics of coexistence processing, such as communication of which communications standard is performed in what frequency band, communication of which communications standards is performed in what channel (a time domain), what communications standard is prioritized (i.e., given priority), and the like. As long as the coexistence standard has been set in advance according to a communications device (i.e., the type of a communications device, such as the name of a manufacturer, a model, and the like), the control signal can also be caused to include only identification information showing that type.

There will now be described a communications device to which the transmission device and the receiving device of the present embodiment can be applied. The embodiment provides descriptions by means of taking, as an example communications device, a communications device which performs broadband communication (2 to 30 MHz) of the multicarrier communications standard by using a power line as a transmission line. The communications device of the embodiment is not limited to the multicarrier communications standard, but may also employ a single carrier communications standard or a spread spectrum scheme. The transmission line used for communication is not limited to the power line, as well. A transmission line; e.g., a coaxial cable, a phone line, a speaker line, a harness, and the like, may also be used.

Figure 9:
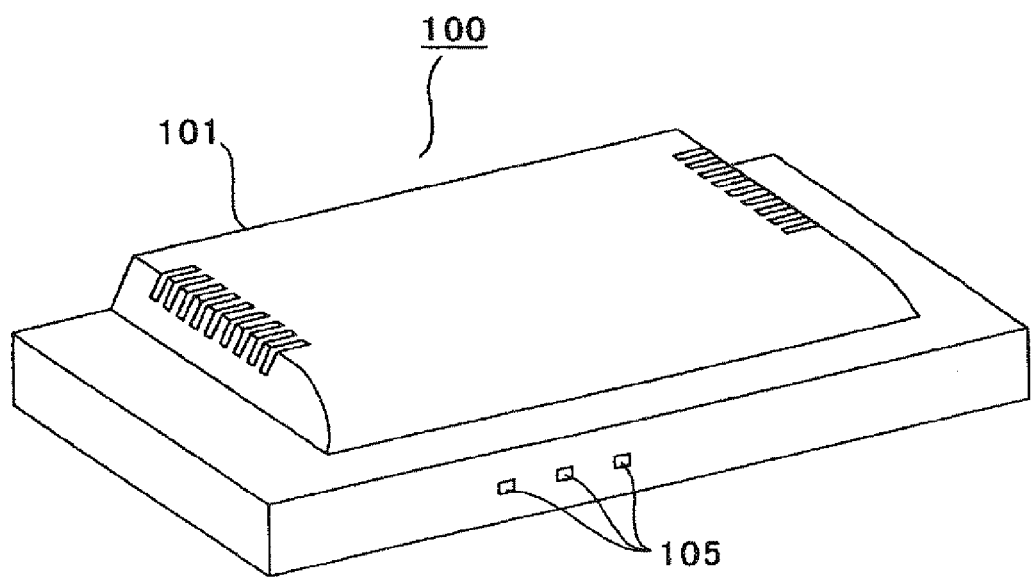
FIG. 9 is an external perspective view showing the front of the communications device according to the embodiment.
Figure 10:
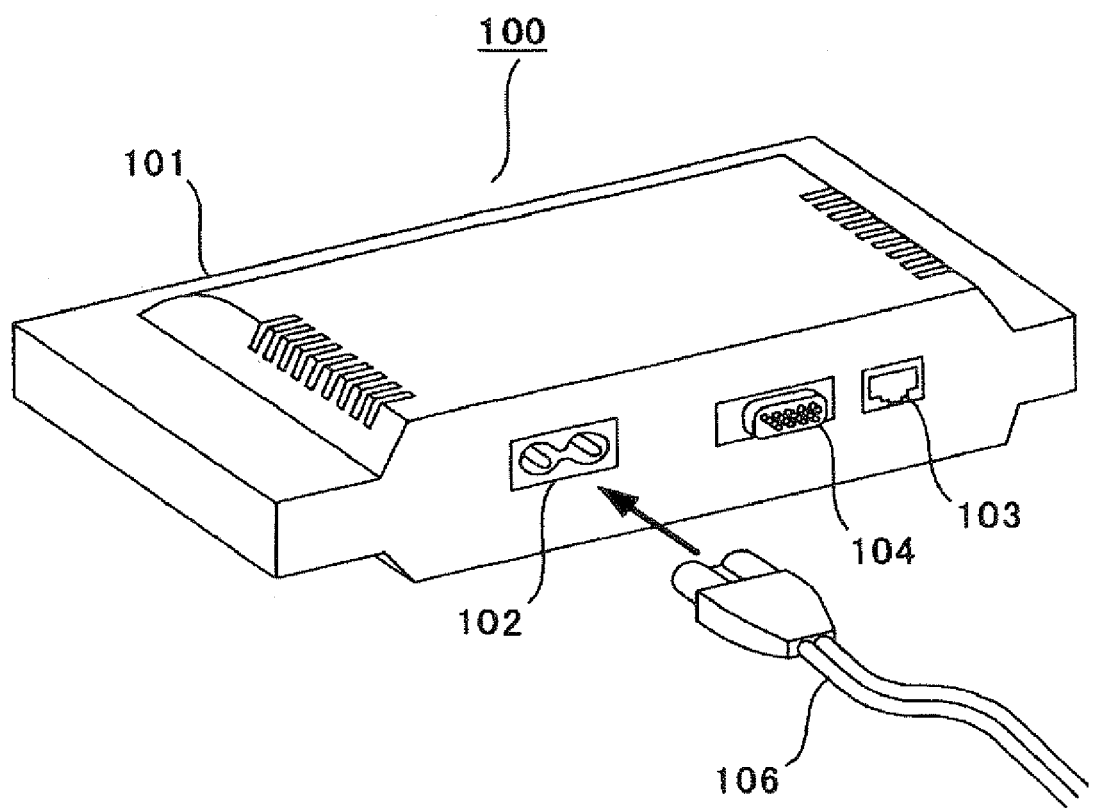
FIG. 10 is an external perspective view showing the back of a communications device according to the embodiment.

FIG. 9 is an external perspective view showing the front of the communications device according to the embodiment, and FIG. 10 is an external perspective view showing the back of a communications device according to the embodiment.

As shown in FIGS. 9 and 10, the communications device 100 of the embodiment corresponds to a modem. The communications device 100 has an enclosure 101. As shown in FIG. 9, a display section 105, such as an LED (Light Emitting Diode) or the like, is provided on the front of the enclosure 101. As shown in FIG. 10, a power connector 102, an LAN (Local Area Network) modulator jack 103 such as RJ45, and a D-sub connector 104 are provided on the back of the enclosure 101. As shown in FIG. 10, a power line 106, such as a parallel cable, is connected to the power connector 102. An unillustrated LAN cable is connected to the modular jack 103. An unillustrated D-sub cable is connected to the D-sub connector 104. Although the modem shown in FIGS. 9 and 10 are shown as an example communications device, the communications device is not limited particularly to the modem. The communications device may be electrical appliance equipped with a modem (e.g., a home electrical product such as a TV set).

Figure 11:
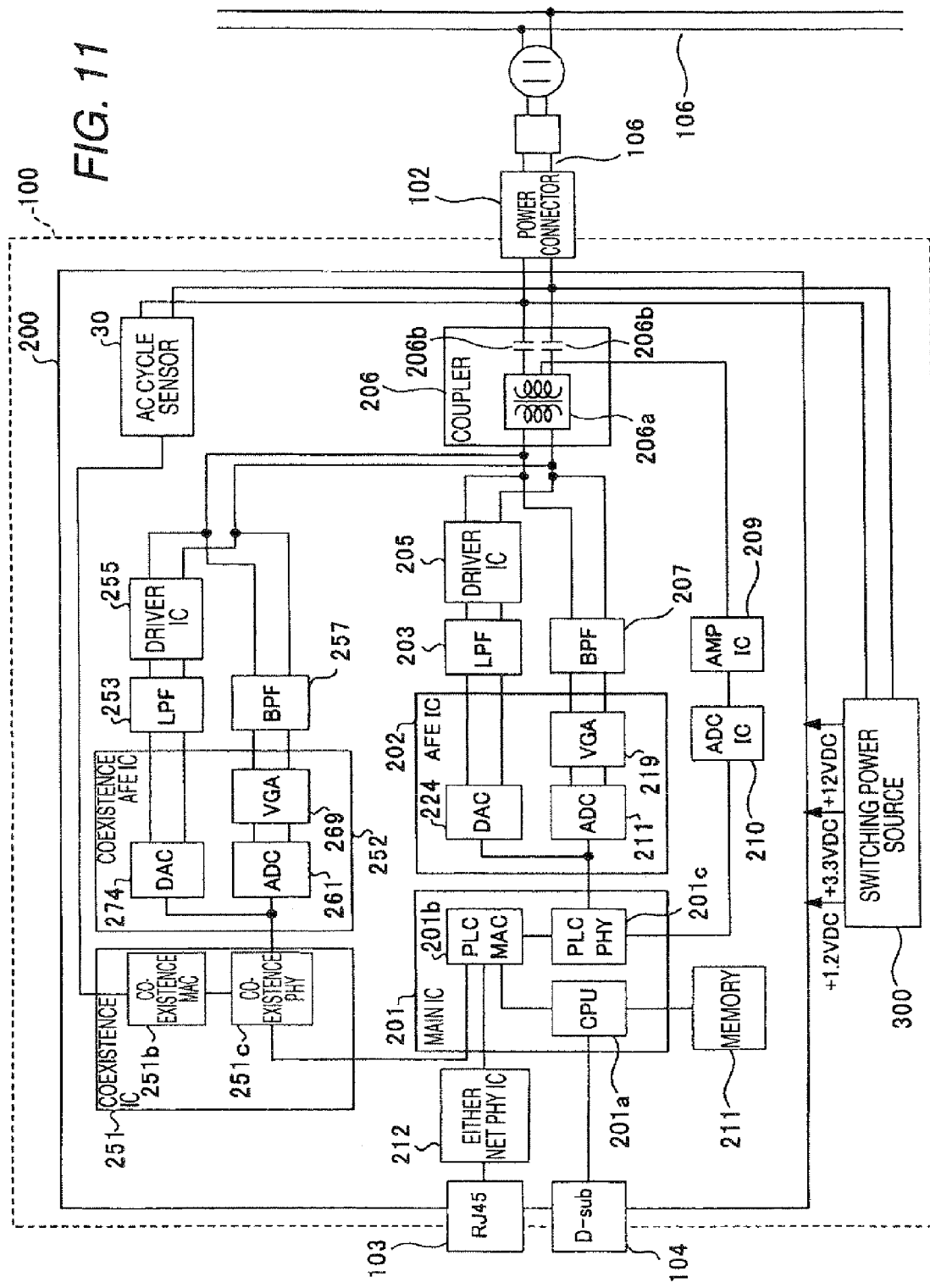
FIG. 11 is a block diagram showing example hardware of a communications device according to the embodiment.

FIG. 11 is a block diagram showing example hardware of a communications device according to the embodiment. As shown in FIG. 11, the communications device 100 has a circuit module 200 and a switching power source 300. The switching power source 300 supplies the circuit module 200 with +1.2V, +3.3V, and +12V volts. The circuit module 200 is provided with a main IC (Integrated Circuit) 201, an AFE IC (Analog Front End IC) 202, a low-pass filter (LPF) 203, a driver IC 205, a coupler 206, a band-pass filter (BPF) 207, an AMP (amplifier) IC 209, an ADC (AD converter) IC 210, memory 211, and an Ethernet (Registered Trademark) physical layer IC (PHYSIC) 212.

The main IC 201 comprises a CPU (Central Processing Unit) 201a; a PLC•MAC (Power Line Communication•Media Access Control) block 201b, and a PLC•PHY (Power Line Communication•Physical Layer) block 201c. The AFE IC 202 comprises a digital-to-analog converter (DAC) 224, an analog-to-digital converter (ADC) 211, and a variable amplifier (VGA) 219. The coupler 206 comprises a coil transformer 206a and a capacitor 206b.

Moreover, the circuit module 200 is provided with a coexistence IC 251, a coexistence AFE IC 252, an LPF 253, a driver IC 255, a BPF 257, and an AC cycle sensor 30. The coexistence IC 251 is formed from a coexistence MAC block 251b and a coexistence PHY block 251c. The AFE IC 252 comprises a DAC 274, an ADC 261, and a VGA 269. The coexistence IC 251 processes a control signal pertaining to coexistence processing. Portions or all of the functions of the coexistence IC 251 may be incorporated into the main IC 201. When the main IC 201 plays all of the functions of the coexistence IC 251, the coexistence AFF IC 252, the LPF 253, the driver IC 255, and the BPF 257 do not need to be provided.

Details of the communications system according to the embodiment will be subsequently described. FIG. 1 is a functional block diagram showing an example general configuration of the communications device according to the embodiment.

As shown in FIG. 1, the communications device 100 has a data communicator 10 which functions as an example data communications section, a communications controller 20 acting as an example communications control section, and the AC cycle sensor 30 acting as an example synchronous signal generation section.

The data communicator 10 is included in the main IC 201 shown in FIG. 11, and is an electrical circuit which performs signal processing, including basic control and modulation-and-demodulation for data communication, as in the case of a common modem. Specifically, the data communicator 10 modulates a data signal output from the communications terminal, such as an unillustrated personal computer, and outputs the thus-modulated data signal as a transmission signal (data). Further, the data communicator 10 demodulates the data signal input from the power line 106 as a received signal (data), and outputs the thus-demodulated signal to a communications terminal such as a personal computer. In order to ascertain whether or not the power line 106 can be used, the data communicator 10 outputs a predetermined communication request signal to the communications controller 20 before communication. The data communicator 10 performs data communication at a frequency band and during a time domain, which are based on a command from the communications controller 20.

In synchronism with the timing of a synchronous signal SS output by the AC cycle sensor 30, the communications controller 20 performs control required by the communications devices 100 of the plurality of types to coexist in the power line 106. Specifically, in accordance with the communications request input by the data communicator 10, a certain station (the communications device 100) performs control for acquiring a priority for usage of the power line 106. In order to conduct a negotiation for acquisition of a priority with another communications device 100, the communications controller 20 transmits a control signal to the power line 106, and receives the control signal from the power line 106.

The AC cycle sensor 30 generates a synchronous signal required by the communications devices 100 of a plurality of types to perform control at common timing. In reality, the waveform of commercial power; i.e., an a.c. voltage waveform AC formed from a sinusoidal waveform 50 Hz or 60 Hz, appears in the power line 106 in Japan. Therefore, a zero-cross point of an a.c. voltage of voltage waveform is detected, and a synchronous signal SS which takes the timing as a reference is generated. The synchronous signal SS shown in FIG. 1 is an example, and corresponds to a rectangular wave consisting of a plurality of pulses synchronous with zero-cross points of the a.c. voltage waveform AC. The a.c. voltage waveform AC is an example of an a.c. waveform of the power line and may be an a.c. current waveform or an a.c. power waveform.

Figure 2:
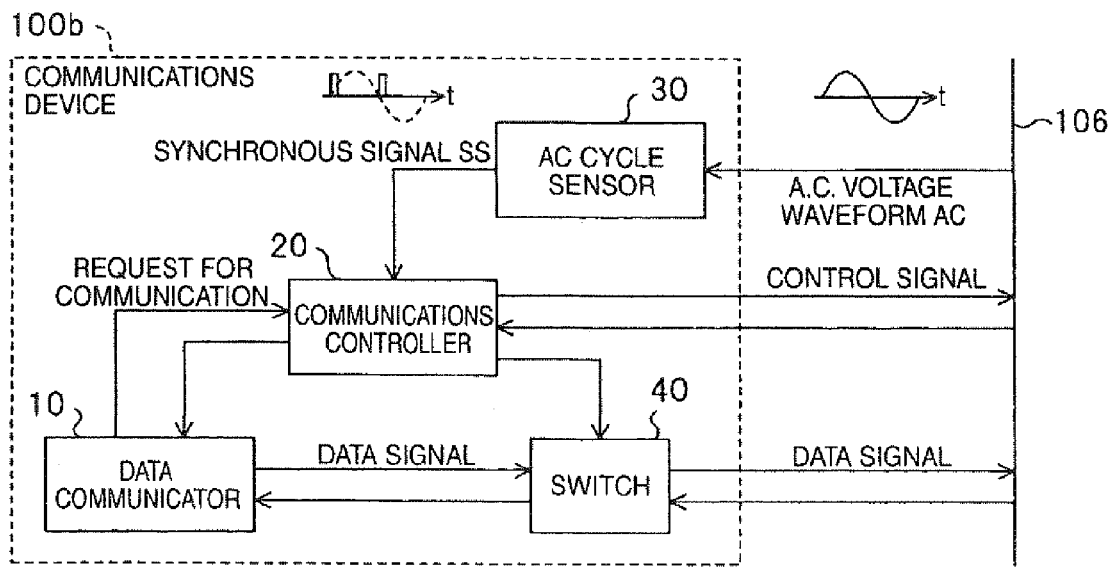
FIG. 2 is a functional block diagram showing another example general configuration of the communications device according to the embodiment.

Switching between receipt of data and transmission of data of the data communicator 10 may be controlled by use of an element capable of controlling activation/deactivation of a physical switch. FIG. 2 is a functional block diagram showing another example general configuration of the communications device according to the embodiment shown in FIG. 1.

As shown in FIG. 2, a communications device 100b has the switch section 40 in addition to including the data communicator 10, the communications controller 20, and the AC cycle sensor 30. The switch section 40 is a switch which is included in the AFE•IC 202 shown in FIG. 11; which control activation/deactivation of power of the DAC 224; and which enables and disables passage of a data signal between the data communicator 10 and the power line 106. The communications controller 20 controls activation/deactivation of the switch section 40 depending on whether or not the communications device can use the band of the power line 106 at the current timing. Transmission and receipt of data can be switched by means of controlling activation and deactivation of an element connected to a line through which the data signal passes. Switching between transmission of data and receipt of data is not always limited to control of activation/deactivation of power performed by the DAC 224. For instance, another element, such as a driver IC 225 or the like, may be subjected to activation/deactivation control. Alternatively, an Enable/Disable signal may be transmitted to the element connected to the line through which the data signal passes rather than activation/deactivation of the element being controlled.

Figure 3:
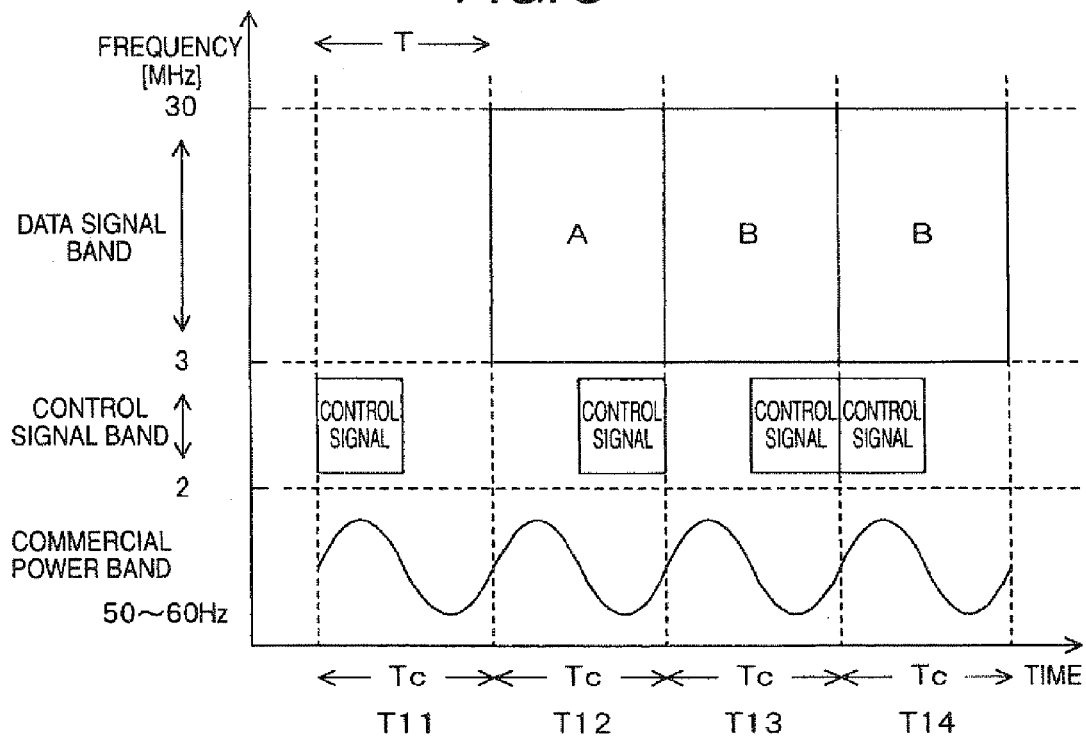
FIG. 3 is a timing chart showing example coexistence processing utilizing an a.c. voltage waveform AC.

There will now be described example coexistence processing for achieving synchronization by utilization of the timing of the a.c. voltage waveform AC as mentioned above. FIG. 3 is a timing chart showing example coexistence processing utilizing the a.c. voltage waveform AC.

As shown in FIG. 3, the frequency band of the power line 106 has been divided into a commercial power band, a control signal band, and a data signal band. Specifically, the commercial power band is assigned so as to fall within a range of 50 Hz to 2 MHz; the control signal band is assigned so as to fall within a range of 2 MHz to 3 MHz; and the data signal band is assigned so as to fall within a range of 3 MHz to 30 MHz. A frequency band to be assigned is arbitrary, and can be changed as required.

The commercial power range cannot be utilized for communication intended for preventing occurrence of interference with commercial power. In this embodiment, a frequency range of 2 MHz to 30 MHz is further divided into a control signal band and a data signal band. The frequency range utilizing the control signal band and the data signal band does not need to be limited particularly to 2 MHz to 30 MHz unless the frequency range overlaps the commercial power band. Further, the frequency band assigned to the control signal does not need to be limited to 2 MHz to 3 MHz, and the frequency range assigned to the data signal band does not need to be limited to 3 MHz to 30 MHz.

The control signal band is used specifically for conducting negotiation in order to acquire priorities by means of which the communications devices 100 of the plurality of types use the power line 106 for communication. Specifically, the frequency of the control signal shown in FIG. 1 is assigned to the control signal band. The data signal band is a frequency band specifically designed for use with a signal used in actual data communication. Namely, the frequency of the data signal shown in FIG. 1 is assigned to the data signal band.

Generally, in a range of 2 MHz to 3 MHz, arising noise tends to increase. In order to achieve high-speed transmission, using the widest possible frequency band for communication is desirable. However, since a low S/N (signal-to-noise) ratio is achieved in a range of 2 MHz to 3 MHz, the fact is that the degree of contribution of this range to high-speed transmission is low. Therefore, even when a range of 2 MHz to 3 MHz is assigned as a control signal band specifically for conducting negotiation, a substantial drop hardly arises in transmission rate.

Figure 4:
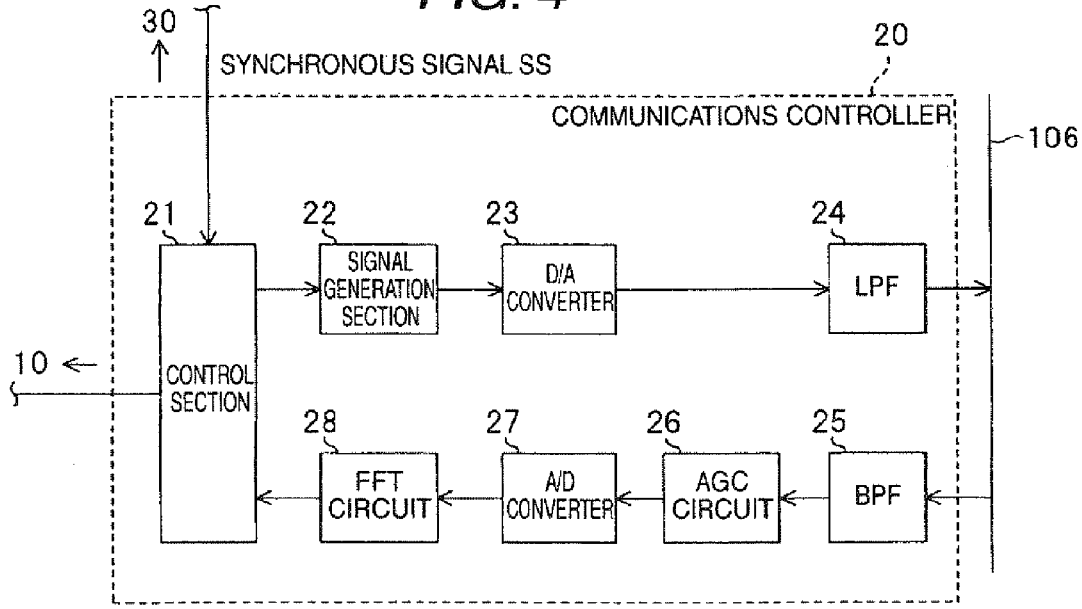
FIG. 4 is a block diagram showing the general configuration of a communications controller according to the embodiment.

There will now be described an internal functional configuration of the communications controller 20 that transmits and receives a control signal for negotiation purpose by use of the control signal band as mentioned above. FIG. 4 is a block diagram showing the general configuration of the communications controller according to the embodiment.

As shown in FIG. 4, the communications controller 20 comprises a control section 21, a signal generator 22, a digital-to-analog converter 23, a low-pass filter 24, a band-pass filter 25, an AGC circuit 26, an analog-to-digital converter 27, and an FFT (Fast Fourier Transform) circuit 28.

The control section 21 is a digital circuit which is included in the coexistence MAC block 251b of the coexistence IC 251 shown in FIG. 11; and which controls the entirety of the communications controller 20 in accordance with a communication request input from the data communicator 10 or the control signal shown in FIG. 1 and in synchronism with the timing of the synchronous signal SS input from the AC cycle sensor 30.

The signal generator 22 is included in the coexistence PHY block 251c of the coexistence IC 251 shown in FIG. 11, and generates a waveform pattern of a signal required to conduct negotiation with another communications device 100 connected to the power line 106, in accordance with the command from the control section 21. This signal is a multicarrier signal. In the present embodiment, an OFDM signal is generated as a control signal. The modulation scheme does not limited particularly to OFDM. For instance, W-OFDM (OFDM based on wavelet conversion) or SS may also be used.

The digital-to-analog converter 23 is included into the DAC block 274 of the coexistence AFE IC 252 shown in FIG. 11, and converts the digital OFDM signal output from the signal generator 22 into an analog signal. The low-pass filter (LPF) (may also be a band-pass filter) 24 is included in the LPF block 253 shown in FIG. 11, and blocks passage of unwanted frequency components in order to output to the power line 106 solely the frequency components of the previously-described control signal band.

The band-pass filter (BPF) 25 is included in the BPF block 257 shown in FIG. 11; extracts only frequency components of the control signal band from the signal appearing in the power line 106; and outputs the thus-extracted frequency components to the AGC circuit 26. The AGC circuit 26 is included in the VGA block 269 of the coexistence AFE IC 252 shown in FIG. 11, and amplifies the signal by means of automatically controlling a gain such that an attenuated, input signal achieves a specified level.

The analog-to-digital converter 27 is included in the ADC block 261 of the coexistence AFE IC 252 shown in FIG. 11, and converts the analog signal input from the AGC circuit 26 into the digital signal. The FFT circuit 28 is included in the coexistence PHY block 251c of the coexistence IC 251 shown in FIG. 11, and subjects the digital signal input from the analog-to-digital converter 27 to predetermined high-speed Fourier conversion processing, to thus convert the multicarrier signal appearing side by side in the time domain into a signal in the frequency domain. The essential requirement for the FFT circuit 28 is to perform FFT processing of, e.g., 128 points. A correlator may also be used in lieu of the FFT circuit 28.

The control section 21 checks the signal output by the FFT circuit 28, to thus ascertain whether or not the other communications devices 100 have transmitted signals as control signals.

FIG. 3 shows an example where coexistence is controlled with a positional relationship between the positions of zero-cross points of the a.c. voltage waveform and the control signal. Processing is performed while a period Tc—a unit used for performing coexistence processing—is taken as a cycle T (60 Hz: 16.67 ms/50 Hz: 20 ms) of the a.c. voltage waveform. When the control signal has come to a position immediately after the position of a rising zero-cross point, the communications device (or the communications standard) A transmits a data signal in the next period Tc. When the control signal has come to a position immediately after a falling zero-cross point, the communications device (or the communications standard) B transmits the data signal in the next period Tc.

As mentioned above, since control is carried out in synchronism with the timing of the synchronous signal generated by the AC cycle sensor 30 from the a.c. voltage waveform AC, control timing can be synchronized with the other communications device 100 connected to the common power line 106.

However, there may also arise a case where a lag arises in the timings of the synchronous signals generated by the plurality of communications devices 100 connected to the common power line 106.

Figure 5A:
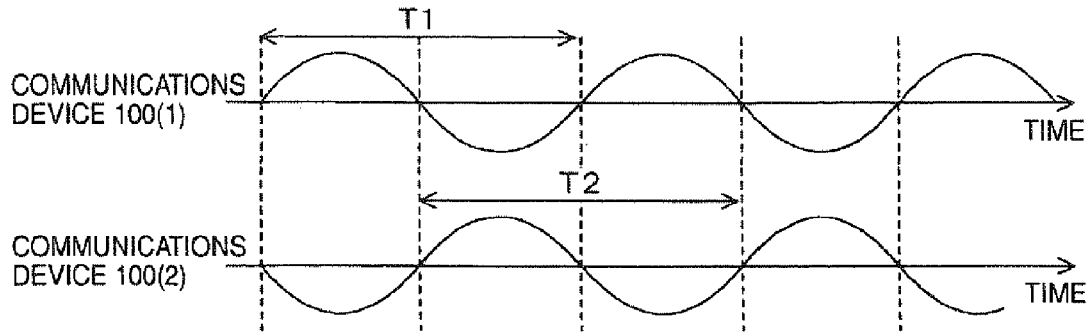
FIGS. 5A to 5C are descriptive views showing control timings in the embodiment.
Figure 5B:
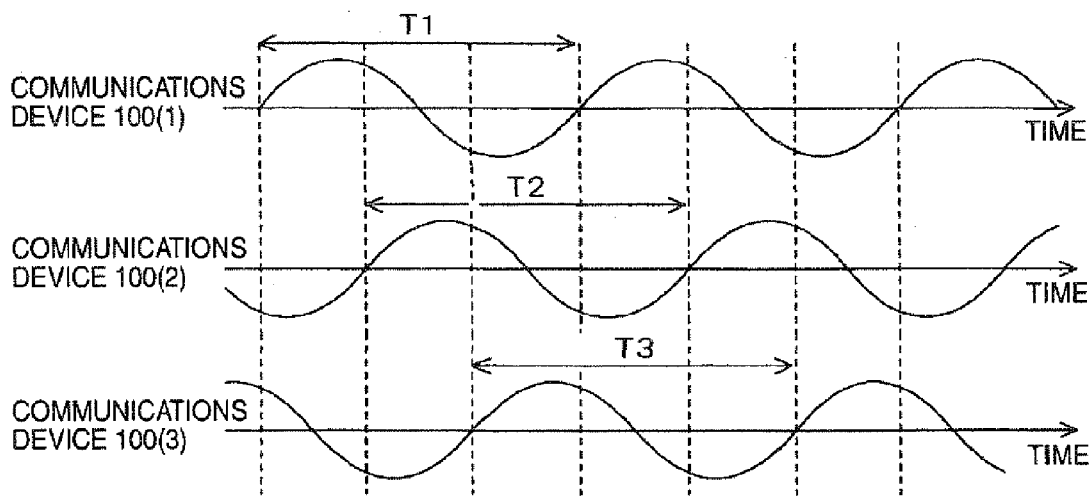
Figure 5C:
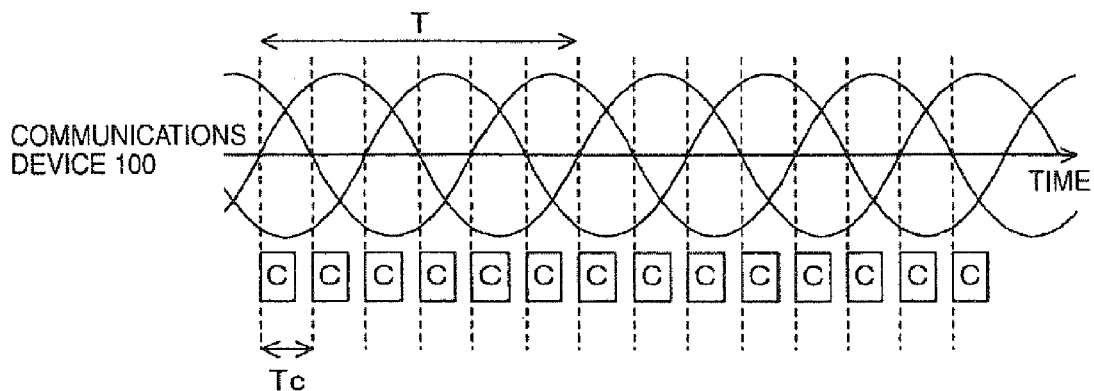

This phenomenon will be described hereinbelow. FIGS. 5A to 5C are descriptive view showing control timings in the embodiment. FIG. 5A is a view showing a phase lag arising when the power line is supplied with a single-phase a.c. voltage; FIG. 5B is a view for describing a phase lag arising when the power line is supplied with a three-phase a.c. voltage; and FIG. 5C is a view showing control timings achieved in the embodiment.

The AC cycle sensor 30 shown in FIG. 1 generates a synchronous signal SS at timing of a zero-cross point at which the a.c. voltage in two lines, which constitute the power line 106, change from positive to negative or timing of a zero-cross point at which the voltage changes from negative to positive. The communications device 100 equipped with the AC cycle sensor 30 is usually connected to a double-pole power plug or a double-pole receptacle provided at the single-phase power line 106 via the power connector 102.

However, the relative orientation between the power plug and the double-pole receptacle is not particularly specified. They can be connected together in an opposite orientation. When the power plug and the double-pole receptacle are connected in opposite orientation, the polarity of the a.c. voltage monitored by the AC cycle sensor 30 in the communications device 100 is inverted, and the phase becomes reverse. As shown in FIG. 5A, a phase difference of 180° arises in the waveform of power handled in communications devices 100(1), 100(2); namely, the communications device 100(1) where the power plug and the double-pole receptacle are connected in a specific orientation (called an "ordinary orientation" for the sake of convenience), and the communications device 100(2) where the power plug and the double-pole receptacle are connected in a reverse direction. Accordingly, as shown in FIG. 3, when the cycle T of the a.c. voltage waveform is taken as a period Tc, a phase difference of 180° has arisen between the communications devices 100(1), 100 (2). When coexistence processing is controlled with the control signal being located in the period Tc, control of coexistence processing fails to arise for reasons of the phase difference.

Moreover, when the power line connected to the communications device 100 is supplied with the three-phase a.c. voltage, a phase difference of 120° arises in a.c. voltages appearing in three lines forming a single power line. Consequently, as shown in FIG. 5B, a phase difference of 120° arises according to the connected state and orientation of connection (polarities) of two lines connected to the AC cycle sensor 30 among the three lines.

As mentioned above, when a difference has arisen in timings of the plurality of communications devices 100 at which the synchronous signal SS arises, a difference also arises in the control timings of the communications devices 100, so that the communications devices fail to operate properly.

When the communications devices 100(1) to 100(3), which are connected while being out of phase with each other through 120', generate the synchronous signal SS at the zero-cross timings while being connected to the common power line 106, the synchronous signal SS appears in any of the communications devices 100 every 60°.

When the communications devices are connected to a power line supplied with an N-phase a.c. voltage, the zero-cross point may appear at timing determined by dividing the cycle T of the a.c. voltage waveform by 2N; namely, every T/2N. Consequently, coexistence processing is controlled while T/2M (M is a natural multiple of N) is taken as a single unit (the period Tc). Thereby, even when there are the communications devices that have been connected while being out of phase with each other, the timing of the zero-cross point is taken as the synchronous signal SS, and the influence of a phase difference can be eliminated.

Namely, when power is the single-phase a.c. voltage, the communications segment Tc is set to one-half the cycle T of the a.c. voltage waveform AC. When power is the three-phase a.c. voltage, the communications segment Tc is set to one-sixth the cycle T of the a.c. voltage waveform AC. Thus, the influence of the phase difference can be eliminated.

Many of countries in the world adopt the single-phase or three-phase a.c. voltage. Hence, the communications device can cope with both the single-phase a.c. voltage and the three-phase a.c. voltage, so long as the period Tc has been set in advance to T/6. When the communications device is assumed to be connected to an a.c. voltage having a plurality of phases, a factor M of T/2M is set in advance to the least common multiple of the number of phases, whereby the communications device can cope with the a.c. voltage having a phase of that number. FIG. 5C shows an example where coexistence processing is controlled while the period Tc is set to the length of T/6. When the control signal C is transmitted, the communications controller 20 performs transmission in such a way that a signal is included in the period Tc.

Figure 6:
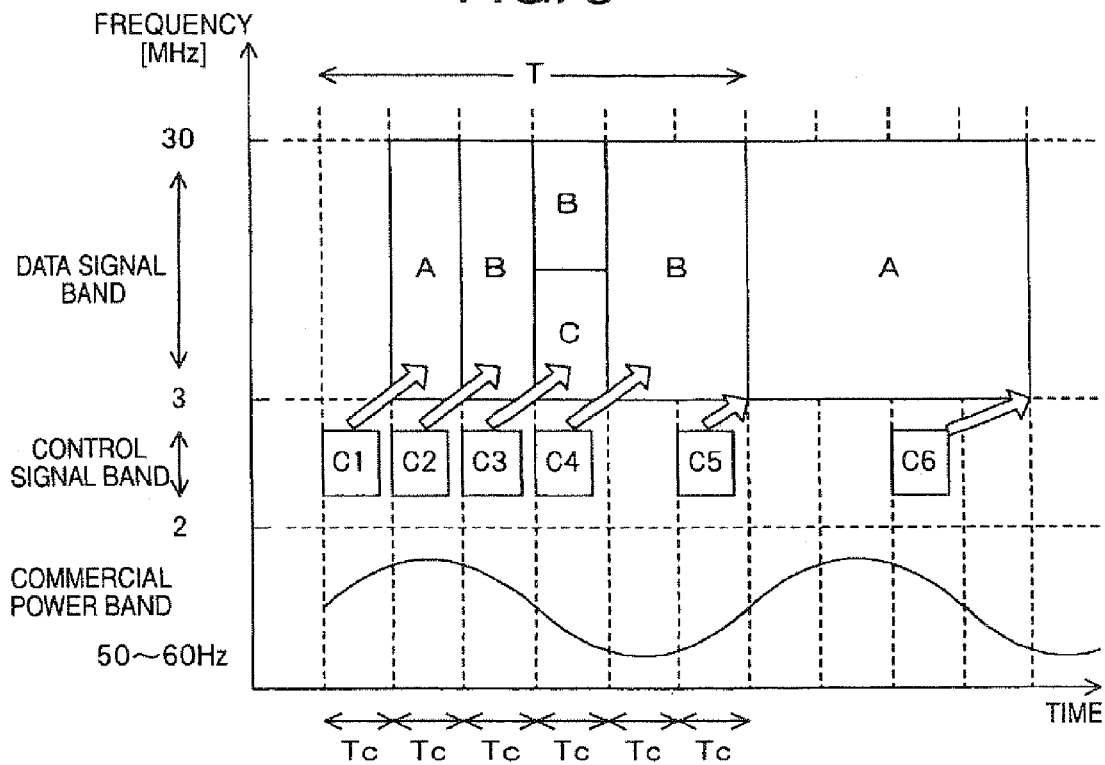
FIG. 6 is a timing chart showing example coexistence processing according to the embodiment.

FIG. 6 is a timing chart showing example coexistence processing according to the embodiment. FIG. 6 shows a case where the period Tc is one-sixth the cycle T of the a.c. voltage waveform AC. As shown in FIG. 6, in accordance with the control signal included in the period Tc, data communication is performed in a communication period subsequent to the period.

For instance, when a control signal C1 including information about priority assigned to the communications device (or the communications standard) A has been transmitted to the power line 106, the communications controllers 20 of the respective communications devices 100 perform coexistence processing such that the communications device (or the communications standard) A performs communication in the next period. When a control signal C2 including information about priority assigned to the communications device (or the communications standard) B has been transmitted to the power line 106, the communications controllers 20 of the respective communications devices 100 perform coexistence processing such that the communications device (or the communications standard) B performs communication in the next period. When a control signal C3 including information about priorities assigned to the communications devices (or the communications standards) B, C has been transmitted to the power line 106, the communications controllers 20 of the respective communications devices 100 perform coexistence processing such that the communications devices (or the communications standards) B, C perform communication in the next period while dividing the predetermined frequency range. The control signal C3 may include information used for specifying a frequency range to be used.

The segment of communication processing of a data signal (hereinafter called a "communication period") does not need to be identical with the period Tc, but should be a natural multiple of the period. An extent to which the communication period becomes greater than the period Tc is previously set in the communications controller 20. For instance, when the communication period is previously set so as to become double the period Tc and when a control signal C4 including the information about priority assigned to the communications device (or the communications standard) B has been transmitted to the power line 106, the communications controllers 20 of the respective communications devices perform coexistence processing in such a way that the communications device (or the communications standard) B performs communication during a period which is double the period Tc. The duration which is double the period Tc is used for data communication.

Information, which defines the length of the communication period rather than defining the communication period, may be included in the control signal. For instance, when the control signal C4 includes information specifying the length of the communication period (which is double the period Tc in this case), in addition to including the information about the communications device (or the communications standard) assigned priority, and has been transmitted, the communications controllers 20 of the respective communications devices may perform coexistence processing in such a way that the communications device (or the communications standard) B performs communication during the specified communication period (which is double the period Tc).

As mentioned above, when the communication period is a natural multiple of the period, processing can be performed without a necessity for changing the cycle (timing) of the period. Further, so long as the duration of the communication period is made longer, processing burden imposed on the control signal can be lessened.

In addition to including information showing at least one of a communications device and a communications standard, the control signal may include information about a request for starting communication complying with the communications device or communications standard or information about the end of communication. For instance, a control signal C5 shown in FIG. 6 includes information about the start of communication of the communications device (or the communications standard) A, and a control signal C6 shown in FIG. 6 includes information about the end of communication of the communications device (or the communications standard) A. When the control signal C5 has been transmitted, the communications controllers 20 of the respective communications devices perform coexistence processing in such a way that the communications device (or the communications standard) A starts communication. When the control signal C6 has been transmitted, the communications controllers 20 of the respective communications devices perform coexistence processing in such a way that the communications device (or the communications standard) A ends communication. Thus, data communication can be controlled by use of only the start time and the end time of communication as the timings of communication of the control signal. Consequently, processing load imposed on the control signal can be lessened.

There has been described a case where the control signal is output only at once during the period C, by reference to FIG. 6. A single control signal can also be output consecutively (during the periods Tc which are adjacent to each other in terms of time). By means of this configuration, the reliability of coexistence processing can be enhanced. FIG. 6 has described a case where the control signal and the data signal are output during a single period Tc. However, the control signal and the data signal can also be output in such a way that these signals do not overlap each other in terms of time. Thereby, a far-to-near problem of leakage of a signal from one band to another band can be prevented, and a drop in coverage can be prevented.

Figure 7:
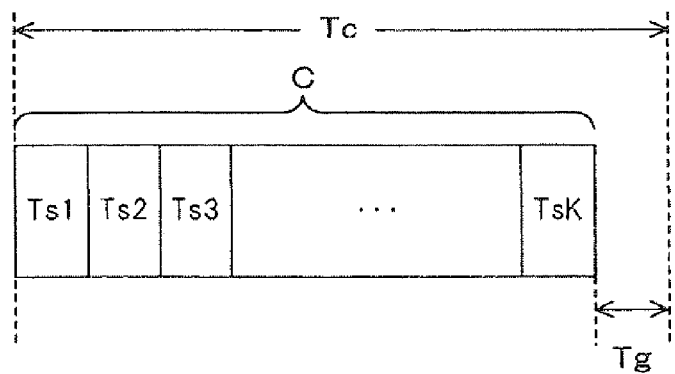
FIG. 7 is a view showing an example data configuration of a control signal in the embodiment.
Figure 8:
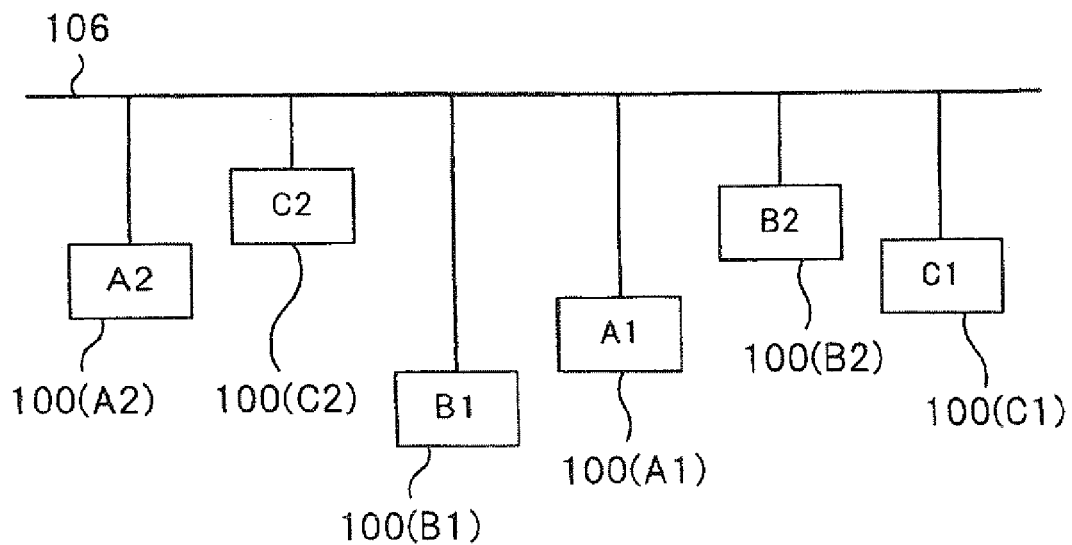
FIG. 8 is a block diagram showing an example configuration of a system where a plurality of communications devices are connected to a common transmission line.

FIG. 7 is a view showing an example data configuration of a control signal in the embodiment. As shown in FIG. 7, the control signal C has a plurality of data slots Ts1 to TsK. Information (about control method specifics of coexistence processing) included in the control signal is expressed by means of on/off operations of respective slots. In this case, when the number of data slots included in the control signal C is K, operations (information showing control method specifics), whose number of types is the $K^{th}$ power of 2, can be expressed by means of a combination of on/off operations of the respective slots. In consideration of an error in detection of the AC cycles of the communications devices, setting of a guard time Tg is desirable.

According to such a communications device and a communications method of the embodiment, timing is controlled by use of the synchronous signal generated from timings of the a.c. voltage waveform AC of the power line. Hence, timings of signal transmission and monitoring of communications devices of different types can be matched to each other. Further, as a result of the period being set to T/2M (M is N multiplied by a natural number), an N-phase a.c. voltage is used, and a plurality of communications devices of different phases can be synchronized with each other according to the orientation of connection between the power plug and the receptacle.

The control signal C shown in FIG. 7 has been described by reference to the case where one communications device outputs the control signal. However, a plurality of control signals may be output during the period Tc in response to the respective data slots Ts1 to TsK. For instance, data slots may have previously been assigned according to the communications standard, and the respective communications devices may output control signals to the data slots complying with the communications standards to which the communications devices pertain. Thereby, control method specifics of coexistence processing can also be determined in accordance with the values indicated by the data slots Ts1 to TsK formed from the plurality of control signals.

For instance, where communications devices of communications standards A, B, C, D, . . . , are present, the communications devices of the communications standards A, B, C, . . . have been set so as to output control signals in response to the data slots Ts1, Ts2, Ts3, When "1," "0," "0," . . . are output in response to the control signals corresponding to the data slots Ts1, Ts2, Ts3, . . . , priority is given to the communications standard A. When "0," "0," "1," . . . are output in response to the control signals corresponding to the data slots Ts1, Ts2, Ts3, . . . , priority is given to the communications standard C. At this time, the control signal of the high-priority communications standard is preferably set at a position as far left as possible in FIG. 7 (i.e., the head of the period Tc). As a result, the coexistence standard of the next period Tc can be determined in an early stage.

Further, a different number of data slots can also have been assigned according to the type of communications standard. For instance, when one type of communications standard adopting frequency division (e.g., an access-type communications standard) is present and a plurality of types of communications standards adopting time division (e.g., a customer-premise-type communications standard) are present, a communications device of frequency division is given one data slot, and the respective time-division communications devices are assigned a plurality of data slots. In connection with frequency division, there is no necessity for causing communications standards adopting frequency division to coexist. In the meantime, in connection with time division, there is a necessity for causing a plurality of communications standards adopting time division to coexist, because the latter case requires a greater amount of information than does the former case. Hence, the period Tc can be efficiently used with regard to information about a coexistence standard.

As shown in FIGS. 1 and 2, the previous embodiment has described an example of communications devices 100, 100b equipped with the data communicators 10. However, adoption of the data communicator 10 is not always necessary. For instance, a power line communication modem not having the function of outputting a control signal is provided with a communications device (i.e., an adapter which outputs a control signal) including the AC cycle sensor 30 and the communications controller 20, so that the power line and the adapter can be caused to act as the communications device 100.

This application is based upon and claims the benefit of priority of Japanese Patent Application No. 2005-196598 filed on Jul. 5, 2005, the contents of which are incorporated herein by reference in its entirety.

A communications device and a communications method can be provided, which enable control of data communication for avoiding occurrence of collision of signals even when a plurality of types of communications devices, which differ from each other in terms of communications standards, are connected to a common transmission line.

What is claimed is:

1. A communications device for being connected to a power line to perform communications over the power line, the power line distributing an N-phase alternative voltage comprising N waveforms each having a predetermined waveform cycle having a period T and being offset in phase relative to each other, the communications device comprising:
    a controller that outputs a control signal to the power line within a period of T/2M, the control signal including information for allowing a plurality of communications devices to co-exist on the power line, where M=n·N, n being a natural number and N being the number of waveforms of said N-phase alternative voltage,
    wherein the control signal includes one of a request for starting communication and a communication of end information.

2. The communications device according to claim 1, further comprising:
    a data communications section that performs data communication by way of the power line,
    wherein the controller controls data communication performed by the data communications section in accordance with the control signal.

3. The communications device according to claim 1, wherein the control signal has a plurality of divided time segments, and specifics of a control method are indicated by a combination of signals of the respective time segments.

4. The communications device according to claim 1, wherein the controller outputs the control signal to the power line when the data communications section does not perform data communication.

5. A communications device for being connected to a power line to perform communications over the power line, the power line distributing an N-phase alternative voltage comprising N waveforms each having a predetermined waveform cycle having a period T and being offset in phase relative to each other, the communications device comprising:
    a controller that outputs a control signal to the power line within a period of T/2M, the control signal including information for allowing a plurality of communications devices to co-exist on the power line, where M=n·N, n being a natural number and N being the number of waveforms of said N-phase alternative voltage; and
    a data communications section that performs data communication by way of the power line,
    wherein the controller controls data communication performed by the data communications section in accordance with the control signal.

6. The communications device according to claim 5, wherein the controller controls data communication within a communication period subsequent to the period, in which the controller outputs the control signal to the power line, in accordance with the control signal.

7. The communications device according to claim 6, wherein the control signal further includes information indicating a length of the communication period.

8. The communications device according to claim 6, wherein the data communications section performs data communication in each communication period.

9. The communications device according to claim 5, wherein the controller controls data communication within a communication period subsequent to the period, in which the controller outputs the control signal to the power line, in accordance with a control signal received from another communications device.

10. The communication device according to claim 9, wherein the communication period has a length equal to a length of the period, in which the controller outputs the control signal to the power line, multiplied by an integer.

11. The communications device according to claim 5, wherein the control signal has a plurality of divided time segments, and specifics of a control method are indicated by a combination of signals of the respective time segments.

12. The communications device according to claim 5, wherein the controller outputs the control signal to the power line when the data communications section does not perform data communication.

13. A communications device, for being connected to a power line to perform communications over the power line, the power line distributing an N-phase alternative voltage comprising N waveforms each having a predetermined waveform cycle having a period T and being offset in phase relative to each other, the communications device comprising:
    a controller that outputs a control signal to the power line within a period of T/2M, the control signal including information for allowing a plurality of communications devices to co-exist on the power line, where M=n·N, n being a natural number and N being the number of waveforms of said N-phase alternative voltage,
    wherein the control signal has a plurality of divided time segments, and specifics of a control method are indicated by a combination of signal of the respective time segments.

14. The communications device according to claim 13, wherein the controller outputs the control signal to the power line when the data communications section does not perform data communication.

15. A communications device, for being connected to a power line to perform communications over the power line, the power line distributing an N-phase alternative voltage comprising N waveforms each having a predetermined waveform cycle having a period T and being offset in phase relative to each other, the communications device comprising:
    a controller that outputs a control signal to the power line within a period of T/2M, the control signal including information for allowing a plurality of communications devices to co-exist on the power line, where M=n·N, n being a natural number and N being the number of waveforms of said N-phase alternative voltage,
    wherein the controller outputs the control signal to the power line when the data communications section does not performs data communication.

16. A communications method for communications device that is connected to a power line to perform communication over the power line, the power line distributing an N-phase alternative voltage comprising N waveforms each having a predetermined waveform cycle having a period T and offset in phase relative to each other, the method comprising:
    outputting a control signal to the power line within a period of T/2M, the control signal including information for allowing a plurality of communications devices to co-exist on the power line, where M=n·N, n being a natural number and N being the number of waveforms of said N-phase alternative voltage, wherein the control signal includes one of a request for starting communication and a communication of end information.

17. A communications method for communications device that is connected to a power line to perform communication over the power line, the power line distributing an N-phase alternative voltage comprising N waveforms each having a predetermined waveform cycle having a period T and offset in phase relative to each other, the method comprising:

outputting a control signal to the power line within a period of T/2M, the control signal including information for allowing a plurality of communications devices to co-exist on the power line, where M=n·N, n being a natural number and N being the number of waveforms of said N-phase alternative voltage, and performing data communication by way of the power line, wherein the data communication is performed in accordance with the control signal.

18. A communications method for communications device that is connected to a power line to perform communication over the power line, the power line distributing an N-phase alternative voltage comprising N waveforms each having a predetermined waveform cycle having a period T and offset in phase relative to each other, the method comprising:

outputting a control signal to the power line within a period of T/2M, the control signal including information for allowing a plurality of communications devices to co-exist on the power line, where M=n·N, n being a natural number and N being the number of waveforms of said N-phase alternative voltage, wherein the control signal has a plurality of divided time segments, and specifics of a control method are indicated by a communication of signals of the respective time segments.

19. A communications method for communications device that is connected to a power line to perform communication over the power line, the power line distributing an N-phase alternative voltage comprising N waveforms each having a predetermined waveform cycle having a period T and offset in phase relative to each other, the method comprising:

(a) outputting a control signal to the power line within a period of T/2M, the control signal including information for allowing a plurality of communications devices to co-exist on the power line, where M=n·N, n being a natural number and N being the number of waveforms of said N-phase alternative voltage, wherein operation (a) includes outputting the control signal to the power line when the data communications section does not perform data communication.

* * * * *